Patented July 29, 1952

2,605,167

UNITED STATES PATENT OFFICE 2,605,167

METHOD FOR PREPARING IMPROVED SULFIDIC PIGMENTS

James J. O'Brien, Baltimore, Md., assignor to The Glidden Company, Cleveland, Ohio, a corporation of Ohio No Drawing. Application August 20, 1948, Serial No. 45,437

18 Claims. (Cl. 23—134)

This invention relates to improvements in methods for making zinc and/or cadmium sulfide and sulfoselenide pigments of the extended or unextended types.

Barium sulfide or sodium sulfide solutions have been used extensively for many years in the production of zinc and cadmium pigments by reacting one of the sulfide solutions with soluble zinc and/or cadmium salts to bring about the precipitation of these latter metals in the form of sulfides. By appropriate selection of soluble zinc and/or cadmium salts, and by including selenium in the sulfide solutions when desired, the reactions may be directed to produce pure zinc sulfide pigments, cadmium zinc sulfide pigments, pure cadmium sulfide or sulfoselenide pigments, zinc lithopones, zinc-cadmium lithopones, cadmium lithopones, and cadmium sulfoselenide lithopones. In the use of alkali-metal and barium sulfide solutions for producing such types of pigment, it has long been recognized that when such metal sulfide is dissolved in water it hydrolyzes to form the corresponding metal hydrate and sulfhydrate. It has also been long indicated that within the concentration ranges and temperatures usually employed for reactions of the above type, the ratio of the sulfhydrate to hydrate concentrations is close to but usually less than unity. A few proposals have been made in the past to alter the ratio of sulfhydrate to hydrate in the metal sulfide solutions prior to effecting the strike, but such alteration of the ratio has heretofore been made by employing hydrogen sulfide, by adding barium hydrate or barium sulfhydrate to a barium sulfide solution or by adding sodium hydrate or sodium sulfhydrate to a sodium sulfide solution. In my copending application Serial No. 787,038, filed November 17, 1947, now Patent No. 2,500,958, I have described and claimed a novel method employing refrigeration of the sulfide solution. I have now found, however, that the ratio of sulfhydrate to hydrate in such alkali-metal or barium sulfide solutions can be increased appreciably by novel means hereinafter described. I have also found that by so increasing the ratio, meritorious improvements in the resulting pigments can be achieved, particularly in respect of the tinting strength, color and texture.

Accordingly, it is an object of the invention to provide a novel process for producing improved sulfide and sulfoselenide pigments.

It is a further object to provide a novel process wherein improvements in tinting strength, color and texture of sulfide and sulfoselenide pigments are obtained as a result of increasing the ratio of sulfhydrate to hydrate in aqueous alkali-metal and barium sulfide or sulfoselenide solutions.

It is a further object to increase the ratio of sulfhydrate to hydrate in aqueous alkali-metal or barium sulfide solutions by precipitating and removing compounds containing hydroxyl ions from said solutions.

These and other objects will be apparent from the following description of the invention.

Barium sulfide and sodium sulfide hydrolyze according to the following ionic equations when dissolved in water:

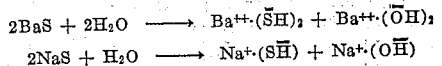

The molecular ratio of the sulfhydrate to hydrate in the hydrolysis is indicated here to be 1 to 1. Under some conditions, however, the molecular ratio may be somewhat less than 1 to 1. I have found, however, that whatever the initial ratio may be as a result of the hydrolysis conditions, by adding to the solution a water-soluble calcium and/or magnesium salt, calcium and/or magnesium hydrates are precipitated and may be filtered off. By so precipitating part of the hydroxyl ions from the solution, the weight ratio of sulfhydrate ions to hydrate ions in the liquor can be increased quite appreciably. Preferably, the precipitate is filtered off as completely as possible so as to provide a clarified filtrate. The filtrate with its higher ratio of these ions may then be reacted preferably at moderate temperatures below about 50° C. with various soluble zinc and/or cadmium salts to produce sulfide pigments which manifest improved color, texture and tinting strength. When sulfoselenide pigments are desired, selenium may be dissolved in the sulfide solution which has been treated to modify its SH/OH ratio, and the sulfoselenide solution may then be reacted with the pigment metal salts.

In carrying out my invention I may start with any convenient concentration in water of barium or alkali-metal sulfide, from one very dilute to one approaching saturation. By adding the said calcium or magnesium salts in small variable amounts a metathesis occurs and calcium or magnesium hydrates are formed and precipitated, with the result that relatively large percentages of hydroxyl ions can be immobilized whether the resulting precipitate is or is not removed from the liquor. As indicated, however, in the usual pigment practice, the precipitate is filtered off as completely as possible. The precipitates are readily agglomerated in warm liquors and may be filtered off quite completely without undue difficulty. The sulfhydrate ion concentration of the solution being treated is not materially affected by the treatment so that the filtrate contains most of the sulfhydrate ions which were originally present, while containing only that quantity of barium or alkali-metal hydrate which corresponds to the hydroxyl ions remaining in the solution; e. g., in the filtrate after the filtration step has been completed. As a result, the ratio of sulfhydrate to hydrate ions in the solution is increased substantially in direct proportion to the amount of hydroxyl ions immobilized or removed in the form of calcium or magnesium hydroxide. The filtrate is substantially free of calcium or magnesium ions arising from the added salts, since the small amounts of salts added for the purpose of effecting adjustment of the sulfhydrate to hydrate ions are precipitated quite completely as calcium or magnesium hydroxides, due to the relatively slight solubility of these compounds. Magnesium hydroxide is more insoluble than calcium hydroxide, so that magnesium salts are preferably used if a solution almost completely free of the precipitating cations is desired. The metathetical reactions which occur are illustrated by the following unbalanced schematic reactions:

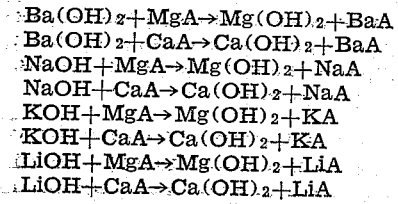

In these reactions A represents any suitable innocuous acid radical. This acid radical or anion is one which when combined with either magnesium or calcium produces a water-soluble magnesium salt or a water-soluble calcium salt. It is also preferable that the acid radical be one which yields water-soluble salts of barium or of the alkali metals. This preference will be apparent when it is recognized that if the acid radical yields insoluble salts of barium or of the alkali metals, then the metathesis not only removes OH ions from the sulfide solution but also removes some barium or alkali metal ions. Sulfate ions and chromate ions, for example, would yield insoluble barium sulfate or barium chromate, and these insoluble barium salts would be filtered off along with the magnesium or calcium hydrates formed by the metathesis. Such loss of barium ions is undesirable, particularly when the barium sulfide solution which is being treated to modify its SH/OH ratio is intended for subsequent use in preparing a lithopone-type pigment. Numerous acid radicals of these desired characteristics are available for use in the invention, as for example, nitrate, chlorate, perchlorate, chloride, bromide, iodide, sulfide as derived from calcium sulfide, sulfhydrate, formate, isobutyrate, etc. For most purposes I prefer to use calcium or magnesium nitrate since I have found that sulfide solutions which have been treated with these nitrate salts exhibit a reduced tendency to crystallize.

As indicated above, I have found that alkali metal sulfide solutions and alkali-earth metal sulfide solutions which have been treated in the described manner are stable in respect to their increased sulfhydrate to hydrate ratios for long periods of time at temperatures up to about 100° C. Stability at this or lower temperatures is an outstanding characteristic of the solutions prepared by the present invention and is in contrast with other known methods for increasing SH/OH ratios. The stability of hot solutions is of particular advantage in that it permits agglomeration of the calcium or magnesium hydrates prior to filtering, and reduces the loss of barium or sodium sulfhydrates through occlusion of them by said precipitated hydrates.

The strike of the sulfide solution having a modified SH/OH ratio may be made in any of the usual manners with the soluble zinc and/or cadmium salt solutions. That is, the two solutions may be reacted together simultaneously, the modified sulfide solution may be added to the soluble pigment-metal salt solution, or the pigment metal salt solution may be added to the modified sulfide solution. Other sequences may also be used without material effect on the improvements afforded by the modified SH/OH ratio of the sulfide solution. As indicated, it is preferable that the strike be effected at temperatures below about 50° C. as higher temperatures may result in the loss of some sulfur in the form of hydrogen sulfide. The densities or concentrations of the soluble pigment-metal salt solutions are immaterial but preferably are neither more dilute nor more concentrated than is customary and well understood by those skilled in the art.

The pH of the strike pulp may range between about 1.2 and 6 depending on the particular pigment which is being prepared. It is generally recognized in the art that the cadmium pigments may be precipitated throughout this entire range, and it is also generally recognized that the zinc sulfide or lithopone pigments may be precipitated at pH's as low as about 1.7. The selection of appropriate pH values is accordingly well within the ability of one skilled in the art, due regard being given to recognized effects of pH on the pigmentary qualities of the particular type of pigment being precipitated and treated. I particularly prefer, however, to secure a final pH of about 6.0 in effecting the strikes for any of the zinc or zinc-cadmium pigments mentioned hereinabove.

The precipitates obtained from the strikes are generally dried, and then calcined under conditions of temperature and atmosphere well known to those skilled in the art. However, some precipitates, such as the cadmium sulfide yellow, need not be calcined to be suitable for use as pigments. Accordingly, it will be understood that the calcining step may be an optional step in a process for making pigments of improved quality in accordance with the principles of this invention.

The following examples illustrate the principles of my invention:

*Example 1*

A stock calcium nitrate solution was prepared by dissolving 340 grams of calcium hydroxide in 550 ml. nitric acid and 1500 ml. water. The solution was made neutral to methyl orange and was filtered. The filtrate had a density of 24.6° Bé. at 33° C.

A barium sulfide solution having a density of 17° Bé. at 52° C. was treated to modify its SH/OH ratio, by adding 57.5 ml. of the stock calcium nitrate solution to 250 ml. of the barium sulfide solution, heating the mixed solutions to 50° C. and filtering off the precipitate of calcium hydrate. The filtrate had a density of 15° Bé. at 50° C. and an SH/OH ratio of 7.3.

*Example 2*

Two and one-half liters of a barium sulfide solution having a density of 21° Bé. at 40° C. were treated with 400 ml. of a calcium chloride solution which was neutral to methyl orange and had a density of 18.5° Bé. at 37° C. The mixture of solutions was warmed to 50° C. and the precipitate of calcium hydroxide which formed was filtered off. The filtrate was a barium sulfide solution having a density of 18.8° Bé. at 32° C. and an SH/OH ratio of 1.77. When the treatment was repeated except that the mixture of solutions was heated to 100° C. before filtering off the calcium hydroxide, a filtrate was obtained having an SH/OH ratio of 1.86. The higher ratio results from the decreased solubility of calcium hydroxide at the higher temperature.

*Example 3*

To 250 ml. of a barium sulfide solution having a density of 20° Bé. at 50° C. was added 39 ml. of the stock calcium nitrate solution of Example 1. The mixture of solutions was heated to 50° C. and the calcium hydrate was filtered off. The filtrate was a barium sulfide solution having a density of 17° Bé. at 50° C. and an SH/OH ratio of 2.05. When the filtrate was heated to 100° C., its SH/OH ratio remained unchanged, indicating its stability at high temperatures.

*Example 4*

To 250 ml. of a barium sulfide solution having a density of 20° Bé. at 50° C. was added 49.5 ml. of the stock calcium nitrate of Example 1. The mixture of solutions was heated to 50° C. and the precipitate of calcium hydrate was filtered off. The filtrate was a barium sulfide solution having a density of 17° Bé. at 50° C. and an SH/OH ratio of 3.04.

*Example 5*

A solution of sodium sulfide was prepared by dissolving 567.5 grams of flake sodium sulfide in 2 liters of water. The solution had a density of 17.3° Bé. at 28° C.

To the sodium sulfide solution was added 600 ml. of the stock calcium nitrate solution of Example 1. The mixture of solutions was heated to 50° C. and the precipitated calcium hydrate was filtered off. The filtrate was a sodium sulfide solution having an SH/OH ratio of 2.

*Example 6*

A stock magnesium nitrate solution was prepared by dissolving 650 grams of technical magnesium carbonate in 2 liters of water and 845 ml. of 42° Bé. nitric acid. The solution was made neutral to methyl orange and was then filtered. The filtrate was a magnesium nitrate solution having a density of 23.6° Bé. at 36° C.

To 2 liters of a barium sulfide solution having a density of 17.7° Bé. at 36° C. was added 210 ml. of the stock magnesium nitrate solution. The mixture of solutions was heated to 50° C. and the precipitated magnesium hydrate was filtered off. The filtrate was a barium sulfide solution having a density of 16.4° Bé. at 22° C. and an SH/OH ratio of 2.

*Example 7*

A pure yellow primrose pigment was prepared by mixing 250 ml. of a cadmium nitrate solution (density, 35° Bé. at 29° C.) with 62.5 ml. of zinc nitrate solution (density, 32° Bé. at 35° C.) and slowly adding to the mixture of solutions 1056 ml. of the barium sulfide solution prepared in Example 4, having an SH/OH ratio of 3.04. The pH was adjusted to 5.3 and the slurry was filtered. The filter cake was reslurried in 2 liters of water at 50° C. and was therein agitated for one hour. The reslurry was filtered, and the filter cake was dried at about 150° C. The dry cake was then calcined from an initial temperature of 368° C. to a final temperature of 588° C., and was quenched in water from the final temperature. The quenched pigment was again dried. The dry pigment had a color slightly darker than the Primrose Standard, and had a tinting strength of 250%.

*Example 8*

A pure yellow pigment was prepared by slowly adding 720 ml. of the barium sulfide solution prepared in Example 3, to 250 ml. of a cadmium nitrate solution (density, 35° Bé. at 20° C.) to a final pH of 5.5 at a final temperature of 30° C. The slurry was filtered and the filter cake was reslurried in 2 liters of water at 50° C., being agitated therein for one hour. The reslurry was filtered and the filter cake was dried at about 150° C. The dry cake was calcined from an initial temperature of 368° C. to a final temperature of 538° C., then quenched in water, filtered and dried. The pigment had a color close to the Orange Standard and a tinting strength of 335%.

*Example 9*

A pure yellow primrose pigment was prepared by first mixing 250 ml. of a cadmium nitrate solution (density 35.3° Bé. at 23° C.) with 62.5 ml. of a zinc nitrate solution (density 32.3° Bé. at 29° C.) and then slowly adding this mixture of solutions to 985 ml. of the barium sulfide solution prepared in Example 6, to a final pH of 5.5 and a final temperature of 30° C. The slurry was filtered and the filter cake was reslurried in 2 liters of water at 50° C., being agitated therein for one hour. The reslurry was filtered, and the filter cake was dried at about 150° C. The dry filter cake was calcined from an initial furnace temperature of 368° C. to a final temperature of 588° C., quenched in water, filtered and dried. The pigment had a color lighter than the Primrose Standard and a tinting strength of 235%.

*Example 10*

A pure red pigment was prepared by reaction of a cadmium nitrate solution with a barium sulfide solution of modified SH/OH ratio having selenium dissolved in it. The barium sulfide solution was modified in its SH/OH ratio by treatment with calcium nitrate solution as described above to produce a filtrate having a density of 14.2° Bé. at 26.5° C. and an SH/OH ratio of 2.82. Two liters of the filtrate were measured out and 30.25 grams of selenium were dissolved therein. One-half liter of a cadmium nitrate solution (density 35° Bé. at 26° C.) was slowly added to the barium sulfide-selenium solution to a final pH of 2.1 and a final temperature of 26° C. The resulting slurry was filtered and the filter cake was reslurried in 2 liters of water at 50° C. and was agitated therein for one hour. The reslurry was filtered and the filter cake was dried at about 150° C. To the dried cake was added and mixed 15% of ammonium nitrate, and the mixture was calcined in an open crucible to about 600° C., then promptly quenched in water, filtered and dried. The dry pigment had a color slightly lighter than the Medium Red Standard and had a tinting strength of 230%.

*Example 11*

A zinc lithopone pigment was prepared by reaction of 400 ml. of zinc sulfate (density, 26.3° Bé. at 44° C.) with 1315 ml. of a barium sulfide solution (density 18.5° Bé. at 32° C.) having an SH/OH ratio of 3.04. The modified ratio was obtained by treating the barium sulfide solution with calcium nitrate and filtering off the precipitated calcium hydrate. In making the pigment strike, the barium sulfide solution was slowly added to the zinc sulfate solution to a finally-adjusted pH of 5 and a final temperature of 29° C. The resulting slurry was filtered, and the filter cake was reslurried in two liters of water at 50° C., being agitated therein for one hour. The reslurry was filtered and the filter cake was dried at about 150° C. The dry pigment was calcined between an initial temperature of 368° C. and a final temperature of 714° C., and was then promptly quenched in water, filtered and dried. The pigment was slightly off-color but had a tinting strength of 113% as compared with 100% for a commercial batch prepared conventionally without treatment of the barium sulfide solution to modify its SH/OH ratio.

Cadmium solutions used in preparing pigments must usually be free of ions of the metals nickel, iron, cobalt and manganese, since these ions produce colored precipitates which if present in the final pigment produce off-colors. The method hereinabove described for modifying the SH/OH ratio of alkali-metal or barium sulfide solutions produces sulfide solutions which may be reacted with a cadmium salt solution contaminated with cobalt, nickel, iron or manganese without encountering harmful effects from such contaminating ions. The following example illustrates this result.

*Example 12*

A yellow lithopone pigment was prepared by slowly adding 1100 ml. of the barium sulfide solution prepared in Example 3 above to 500 ml. of a cadmium sulfate solution (density 35° Bé. at 20° C.) contaminated with .65 gram of nickel sulfate ($NiSO_4 \cdot 6H_2O$). The resulting slurry had a final temperature of 29° C. and its pH was adjusted to 1.2. The slurry was filtered, given a filtrate which was about .175 N in acidity. The filter cake was reslurried in 2 liters of water at 50° C. with agitation therein for one hour. The reslurry was filtered and the filter cake was dried at about 150° C. The dried cake was calcined from an initial furnace temperature of 368° C. to a final temperature of 536° C., then was quenched in water, filtered and dried. The dry pigment was a bright golden yellow with a tinting strength of 140%.

From the foregoing description of the invention, it will be apparent that the principles of the invention may be applied in a variety of ways to secure the advantages which flow from stable sulfide solutions having increased SH/OH ratios. A further embodiment of the invention is yet to be described, wherein calcium sulfhydrate is the soluble second-group metal salt which is used to effect the alteration of the SH/OH ratio of a barium sulfide solution. In this particular embodiment, the calcium sulfhydrate is formed "in-situ" from calcium sulfide, and the calcium sulfide is derived from calcium sulfate. Specifically, what is contemplated is the addition of a small amount, e. g. five to ten percent, of calcium sulfate to the natural barytes ores which is employed in forming a barium sulfide solution. When the barytes is calcined with carbon to reduce it to barium sulfide, the added gypsum is also reduced concurrently to calcium sulfide. When the calcined mixture is subsequently leached with water, the resulting leach liquor is a barium sulfide solution whose SH/OH ratio is higher than would be obtained if gypsum had not been added to the barytes prior to calcination of the latter. The reactions involved are:

$$CaSO_4 + 4C + \text{heat} \longrightarrow CaS + 4CO$$
$$2CaS + 2H_2O \longrightarrow \overset{++}{Ca}(\overline{S}\overline{H})_2 + \overset{++}{Ca}(O\overline{H})_2\downarrow$$
$$2BaS + 2H_2O \longrightarrow \overset{++}{Ba}(S\overline{H})_2 + \overset{++}{Ba}(O\overline{H})_2$$
$$\overset{++}{Ba}(O\overline{H})_2 + \overset{++}{Ca}(S\overline{H})_2 \longrightarrow Ca(OH)_2\downarrow + \overset{++}{Ba}(S\overline{H})_2$$

Thus calcium sulfate is used to introduce calcium sulfide into the calcined barytes, and when the calcined product is leached to extract its barium sulfide, the calcium sulfide therein is also leached and is hydrolyzed to calcium sulfhydrate and calcium hydroxide. The latter hydroxide is largely insoluble and remains behind with the gangue of the barytes ore. The barium sulfide also hydrolyzes during the leaching operation to yield barium sulfhydrate and barium hydroxide, but the latter hydroxide reacts with the calcium sulfhydrate of the leach liquor to produce the soluble barium sulfhydrate and the relatively insoluble calcium hydroxide. When the leach liquor is finally clarified to produce a barium sulfide solution which is to be used in pigment strikes, the two calcium hydroxide precipitates of the foregoing reactions are rejected along with other insolubles, gangue, etc. Accordingly, the principles of this invention are here used in such manner that the processing steps employed in producing a barium sulfide solution from barytes are also effective in carrying out each of the steps of the present invention which are necessary to effect modification of the SH/OH ratio of the barium sulfide solution.

Various other embodiments of the principles of this invention will be apparent to those skilled in the art.

In the following claims, the term "sulfidic pigment" is used to refer to all conventional zinc and/or cadmium sulfide or sulfo-selenide pigments, such as zinc sulfide pigments, zinc lithopone pigments, cadmium-zinc sulfide pigments, cadmium sulfo-selenide pigments, cadmium sulfied lithopones, cadmium sulfo-selenide lithopones, and cadmium sulfide pigments.

In the foregoing examples and elsewhere in the specification, tinting strength values refer to values obtained by a tinting strength test now to be described. In this test $\frac{1}{10}$ gram of the standard color is mixed with 2 grams of a standard grade of lithopone, and with $\frac{7}{10}$ ml. of pale linseed oil, the mixing being effected on a glass plate by means of a spatula. The resulting paste is then mulled by means of forty forward and forty backward strokes of the muller within a space of about 12 inches x 12 inches on the glass plate. After one such mulling the paste is gathered into a pile and is then mulled a second time with forty more backward and forward strokes of the muller. On another glass plate, the pigment whose strength is to be determined (called the unknown) is similarly mixed and mulled with linseed oil and standard lithopone, $\frac{1}{10}$ gram of the unknown being mixed and mulled with that weighed amount of the standard lithopone which is estimated as necessary to give the same tint as that of the sample made with the standard color. The two glass plates are then placed side by side and the tints compared. If the same tints have not been obtained on both plates, then a new plate is made up from the unknown using more or less standard lithopone as is required to obtain the same tint. When finally the unknown and standard plates have the same tint, the tinting strength is calculated on the basis of the percentage of lithopone in the unknown to the lithopone in the standard. Thus if 1.8 grams of lithopone was mixed with the unknown, the tinting strength is 90% (1.8/2.0 x 100), while if 2.2 grams of lithopone was used with the unknown, the unknown has a tinting strength of 110% (2.2/2.0 x 100).

Having described my invention, what I claim as new is:

1. The method of making an improved sulfidic pigment which comprises the steps of: providing an aqueous solution of a metal sulfide selected from the group consisting of alkali metal sulfides and barium sulfide; reacting said metal sulfide solution with a water-soluble salt of a second-group metal selected from the group consisting of calcium and magnesium to precipitate an insoluble hydrate of the said second-group metal and thereby to establish in said sulfide solution an SH/OH ratio in excess of 1 to 1; separating said insoluble hydrate from its mother liquor; striking the resulting mother liquor having an SH/OH ratio in excess of 1 to 1 with an aqueous solution of a water-soluble salt of at least one pigment metal selected from the group consisting of zinc and cadmium, thereby to produce a sulfidic precipitate of the said pigment metal; and separating said sulfidic precipitate from the liquors of the strike slurry.

2. The method as claimed in claim 1 which includes the further step of calcining said sulfidic precipitate under conditions which convert it to a pigment.

3. The method as claimed in claim 1 wherein the aqueous solution of said pigment-metal salt contains minor amounts of heavy metals having atomic numbers between 25 and 28, inclusive.

4. The method as claimed in claim 1 wherein the metal sulfide solution is a solution of barium sulfide.

5. The method as claimed in claim 4 wherein the salt of second-group metal is one whose anion yields a water-soluble salt of barium.

6. The method as claimed in claim 5 wherein the aqueous solution of said pigment-metal salt is contaminated with minor amounts of heavy metals having atomic numbers between 25 and 28, inclusive.

7. The method of making an improved cadmium sulfoselenide pigment which comprises the steps of: providing an aqueous solution of a metal sulfide selected from the group consisting of alkali metal sulfides and barium sulfide; reacting said metal sulfide solution with a water-soluble salt of a second-group metal selected from the group consisting of calcium and magnesium to precipitate an insoluble hydrate of the said second-group metal; separating at least a part of said insoluble hydrate from its mother liquor thereby to establish in said mother liquor an SH/OH ratio in excess of 1 to 1; dissolving selenium in the resulting mother liquor to make a strike solution; striking the said strike solution with an aqueous solution of cadmium salt, thereby to produce a cadmium sulfoselenide precipitate; separating the liquors of the reaction mass from precipitated matter thereof; and calcining said precipitate of matter to convert it to pigment.

8. The method as claimed in claim 7 wherein the aqueous solution of said cadmium salt contains minor amounts of heavy metals having atomic numbers between 25 and 28 inclusive.

9. The method as claimed in claim 7 wherein the metal sulfide solution is a solution of barium sulfide.

10. The method as claimed in claim 9 wherein the cadmium salt is one whose anion yields a water-soluble salt of barium.

11. The method as claimed in claim 10 wherein the aqueous solution of said cadmium salt contains minor amounts of heavy metals having atomic numbers between 25 and 28, inclusive.

12. The method of preparing an improved barium sulfide solution from barium sulfate, which comprises the steps of: mixing a small amount of calcium sulfate with the barium sulfate; calcining the mixture under reducing conditions effective to reduce the sulfates to sulfides; dissolving at least a part of the resulting sulfides in water; and separating the resulting solution from any remaining undissolved matter.

13. The method of making an improved sulfidic pigment which comprises the steps of: mixing a small amount of calcium sulfate with barytes ore; calcining the mixture under reducing conditions effective to reduce the calcium sulfate and barytes to sulfides; leaching the calcined mixture with water to extract soluble sulfides; separating the leach liquor from any undissolved residues and entrained solid matter, thereby to clarify said liquor; striking said clarified liquor with an aqueous solution of a water-soluble salt of at least one pigment metal selected from the group consisting of zinc and cadmium, thereby to produce a sulfidic precipitate of said pigment metal; and separating said sulfidic precipitate from the liquors of the strike slurry.

14. The method as claimed in claim 13 which includes the further step of calcining said sulfidic precipitate under conditions which convert it to a pigment.

15. The method as claimed in claim 13 wherein the aqueous pigment-metal salt solution is contaminated with minor amounts of heavy metals having atomic numbers between 25 and 28, inclusive.

16. The method as claimed in claim 15 wherein the cadmium salt is one whose anion yields a water-soluble salt of barium.

17. The method as claimed in claim 15 wherein the cadmium salt is cadmium sulfate.

18. The method of making an improved cadmium sulfoselenide pigment which comprises the steps of: mixing a small amount of calcium sulfate with barytes ores; calcining said mixture under reducing conditions effective to reduce the calcium sulfate and barytes to sulfides; leaching the calcined mixture with water to extract soluble sulfides; separating the leach liquor from any undissolved residues and entrained solid matter, thereby to clarify said liquor; dissolving selenium in said clarified liquor; striking the resulting liquor with an aqueous solution of a cadmium salt, thereby to produce a cadmium sulfoselenide precipitate; separating the liquors of the strike slurry from the precipitated matter thereof; and calcining the precipitated matter under conditions which convert it to pigment.

JAMES J. O'BRIEN.

REFERENCES CITED

The following references are of record in the file of this patent:

UNITED STATES PATENTS

| Number | Name | Date |
|---|---|---|
| 1,776,029 | Howard | Sept. 16, 1930 |
| 1,936,849 | Mertes | Nov. 28, 1933 |
| 2,030,887 | Mitchell | Feb. 18, 1936 |
| 2,050,802 | Mitchell | Aug. 11, 1936 |